(12) United States Patent
Schwert (10) Patent No.: US 7,641,756 B2
(45) Date of Patent: Jan. 5, 2010

(54) METHOD AND DEVICE FOR LINING A PIPE CONDUIT OR A CHANNEL

(76) Inventor: Siegfried Schwert, Hüttenweg 16, 14195 Berlin (DE)

( * ) Notice: Subject to any disclaimer, the term of this patent is extended or adjusted under 35 U.S.C. 154(b) by 302 days.

(21) Appl. No.: 11/491,615

(22) Filed: Jul. 24, 2006

(65) Prior Publication Data

US 2006/0254711 A1     Nov. 16, 2006

Related U.S. Application Data

(63) Continuation-in-part of application No. 10/148,315, filed on May 29, 2002, now abandoned.

(51) Int. Cl.
*B32B 37/00* (2006.01)
*F16L 1/00* (2006.01)

(52) U.S. Cl. .................. 156/293; 156/287; 156/294; 156/423; 138/97; 118/306; 118/317; 405/184.1; 405/184.2

(58) Field of Classification Search ............... 405/184.1, 405/184.2; 138/97, 177; 156/293, 294, 287, 156/423; 427/230; 118/306, 317; 264/267, 264/269, 573, 270, 517, 516

See application file for complete search history.

(56) References Cited

FOREIGN PATENT DOCUMENTS

WO     WO 92/09843    *   6/1992

* cited by examiner

*Primary Examiner*—Justin Fischer
(74) *Attorney, Agent, or Firm*—Brinks Hofer Gilson & Lione (57) ABSTRACT

A method for lining a pipe conduit with a coated textile tubing that adheres to the inner walls of the pipe conduit by means of an adhesive. The coated textile tubing can be filled with a long pot life adhesive and the textile tubing turned inside out (inverted) while being introduced into the pipe conduit. A fast curing adhesive is substantially simultaneously applied to the inner wall of the pipe conduit in as short a distance as possible to the moving tubing inversion point. The introduced tubing is then subjected to an inner pressure to force the tubing into contact with the pipe inner wall until the fast curing adhesive has cured. Alternatively, an impregnated textile tubing can be substituted for the tubing filled with the long pot life adhesive. As a further alternative, conditions are controlled to cause curing of the adhesive only in the inverted portion of the tubing.

38 Claims, 4 Drawing Sheets

METHOD AND DEVICE FOR LINING A PIPE CONDUIT OR A CHANNEL

CROSS-REFERENCE TO RELATED APPLICATIONS

This application is a continuation-in-part of U.S. patent application Ser. No. 10/148,315, filed May 29, 2002, now abandoned.

BACKGROUND OF THE INVENTION

The present invention relates to a method for lining a pipe conduit or a channel with a sealing inner lining having a tubing, and a device for accomplishing this method.

In U.S. Pat. No. 4,368,091 is disclosed a method for lining the inner surface of a pipe conduit with a flexible tubular lining material, using liquid resin serving as the adhesive. This method has the following steps:

a) filling a metered amount of the resin into the tubular lining material, evenly distributed over its length, b) annularly securing one end of the lining material which contains the liquid resin in its interior, to the one end of the pipe conduit, c) exerting pressure with the aid of a pressure medium on the lining material in such a way that at a turning point, which is formed behind the securing location, the lining material is turned inside-out such that it moves into the pipe conduit and the turning point within the pipe conduit progresses in the direction of movement, the turned lining material being pressed with its resin-coated surface against the inner surface of the pipe conduit, and d) maintaining the pressure through the medium, until the resin is cured.

In this known method, the intention is to use as long tubes as possible as lining material, so that as few access points to the interior of the pipe conduit or of the channel have to be created. Thus, it is already possible to introduce tubes which are more than 500 m long into the pipe conduits or channels. However, this is a process lasting several hours, the filling and distribution of the adhesive (approximately 1000 kg with a nominal diameter of DN 300 and a renovation length of 600 m) alone require more than an hour and the average advancing speed of the tubing is roughly 6 m per minute. The adhesive used must be workable until the lining process is concluded, i.e. have a pot life (duration of workability) of several hours.

In the case of cold curing, the curing time is usually at least five times the pot life, such that the pressure medium has to remain longer than a whole day in the tubing until the adhesive has sufficiently cured. Since with renovation of a pipe conduit or a channel taking place in this manner, normal operation has to be interrupted for this period, this can be connected with considerable operating restrictions. Shortening the curing time by heating the pressure medium is expensive and at least in the renovation of steel pipe conduits is problematic in as far as the pipe conduit should not be heated to temperatures in excess of 30° C., since otherwise welding seam breaks can occur due to the heat tensions and outer bituminous anti-corrosion covers can be damaged. In the case of pipe conduits which are of great length and have large diameters, practically insuperable technical problems arise.

BRIEF SUMMARY

The object of the present invention therefore is so to improve the known method for lining a pipe conduit or a channel with a sealing inner lining having a tubing consisting of a woven fabric, meshing, felt, knitted fabric or non-woven, adhering by means of adhesive to the inner wall of the pipe conduit or channel, that even when tubes of great length, e.g. more than 500 m are used and without heating up of the pressure medium, the downtime caused by the renovation can be considerably shortened.

This object is accomplished according to the invention by the features quoted respectively in claims 1, 2, 3, 15 or 16. Advantageous developments of the method according to the invention as well as a preferred device for accomplishing the method arise from the respectively associated subordinate claims.

The method according to the invention has, according to a first aspect, the following steps:

filling the coated tubing with a metered amount of an adhesive which has a long pot life, evenly distributed over the length of the tubing, introducing the tubing into the pipe conduit or channel, the one end of the tubing being held securely at the rear end, in the direction of movement of the tubing, of the pipe conduit or of the channel and the tubing being introduced by means of pressure application, by being inverted into the pipe conduit or channel, applying a fast-curing adhesive to the inner wall of the pipe conduit or of the channel, substantially at the same time as introducing the tubing into the pipe conduit or channel at as small a distance as possible in front of the end of the tubing moving through the pipe conduit or channel, and generating an internal pressure in the introduced tubing in order to press the latter against the inner wall of the pipe conduit or of the channel until the fast-curing adhesive between the tubing and the inner wall of the pipe conduit or channel has cured.

The use of only a fast-curing adhesive which is applied to the inner wall of the pipe conduit or of the channel would result in this adhesive not completely filling all the cavities in the fabric. It would also be possible for the tubing to drift backwards through the transporting medium in the pipe conduit. If this medium is a gaseous medium transported at high pressure, after some time there is this same pressure also in the cavities. With a reduction of pressure in the pipe conduit, these cavities can then expand and cause bursting of the tubing.

Even the use of a fast-curing two-component adhesive in such a way that the base component was filled into the tubing and distributed in same and the hardener was applied to the inner wall of the pipe conduit or of the channel, would not provide the desired adhesion, since the hardener would not completely penetrate through the base component and therefore no complete curing would be possible.

Due to the additional use of the fast-curing adhesive, even after a short time there is sufficient adhesion of the tubing to the inner wall of the pipe conduit or channel, to be able to dispense with the internal pressure applied by the pressure medium. The pipe conduit or channel can thus be already taken back into operation whilst the adhesive which has a long pot life or curing time is still curing. In this process, the operational pressure in the pipe conduit can possibly act in a supportive manner until the adhesive which has a long pot life has completely cured.

According to a second aspect of the invention, the method uses a tubing comprising a completely impregnated woven fabric, meshing, felt, knitted fabric or non-woven and has the following steps:

introducing the tubing into the pipe conduit or channel, the one end of the tubing being held at the rear end, in the direction of movement of the tubing, of the pipe conduit or channel, and the tubing being introduced by means of pressure application by being inverted into the pipe conduit or channel, applying a fast-curing adhesive to the inner wall of the pipe conduit or channel substantially at the same time as introducing the tubing into the pipe conduit or channel at as small as possible a distance in front of the end of the tubing moving through the pipe conduit or channel, and generating an internal pressure in the introduced tubing in order to press the latter against the inner wall of the pipe conduit or channel until the adhesive between the tubing and the inner wall of the pipe conduit or of the channel has cured.

Since in this method a tubing formed from thoroughly impregnated fabric or the like is used, it is not necessary for the fabric to be impregnated before the tubing is introduced into the pipe conduit in order to avoid air being trapped in the fabric after the tubing has been secured to the inner wall of the pipe conduit. It is therefore sufficient to use only the fast-curing adhesive in order to obtain a secure and homogenous connection between the pipe conduit and the tubing.

Preferably, before or after introducing the tube, a compression-proof barrier layer is applied to the side of the tube which will be on the inside after introduction. In this way it is possible to carry out the pressing on of the tubing and, if the barrier layer is applied before introducing the tube, also to carry out the inversion of the tubing under greater pressure.

According to a third aspect of the invention, the method uses a tubing comprising a coated woven fabric, meshing, knitted fabric or non-woven and has the following steps:

introducing the tubing into the pipe conduit or channel, the one end of the tubing being held securely at the rear end, in the direction of movement of the tubing, of the pipe conduit or channel, and the tubing being introduced by means of pressure application by being inverted into the pipe conduit or channel, applying a fast-curing adhesive to the inner wall of the pipe conduit or channel substantially at the same time as introducing the tubing into the pipe conduit or channel at as small as possible a distance in front of the end of the tubing moving through the pipe conduit or channel, and generating an internal pressure, which is higher than the pressure required to invert the tubing, in the introduced tubing in order thus to press the latter against the inner wall of the pipe conduit or channel, so that the adhesive completely fills the woven fabric, knitted fabric, or non-woven avoiding any trapped air, until the adhesive between the tubing and the inner wall of the pipe conduit or of the channel has cured.

In this case, the exertion of a sufficiently high pressure as the tubing is pressed in makes unnecessary the prior thorough impregnation of the fabric or the like with an adhesive which has a long pot life or some other material, in order nevertheless to obtain a secure connection, free of trapped air, between the pipe conduit and the tubing by means of the fast-curing adhesive. The adhesive is pressed into all the cavities of the fabric. As a supportive measure, a negative pressure can be generated in the portion of the pipe conduit which has not yet been lined, in order to extract air from the fabric.

Chick (GB 1512035) shows a method for lining pipe conduits by means of tubing which is glued to the inner wall of the pipe. The tubing is introduced into the pipe conduit by being turned inside out. A wagon with a spraying device which sprays adhesive against the inner wall of the pipe travels at a distance in front of the front end of the tubing which moves through the pipe conduit. The adhesive fills cracks, holes and the like in the pipe inner wall. The tubing comprises an air-permeable membrane and, in the inverted state, an outer coating of resin-absorbing material such as felt. Therefore, no pressure exceeding the inversion pressure is required to fill any cavities in the resin-absorbing material with adhesive.

According to the fourth aspect of the invention, the method also uses a tubing comprising a coated woven fabric, meshing, knitted fabric or non-woven and has the following steps:

filling the tube with a metered amount of an adhesive under conditions in which curing of the adhesive does not yet take place, with even distribution over the length of the tubing, introducing the tubing into the pipe conduit or channel, the one end of the tubing being held securely at the rear end, in the direction of movement of the tubing, of the pipe conduit or channel, and the tubing being introduced by means of pressure application by being inverted into the pipe conduit or channel, creating the conditions for the adhesive located on the outer side of the inverted portion of the tubing to cure in a short time, and generating an internal pressure, which is higher than the pressure required to invert the tubing, in the introduced tubing in order to press the latter against the inner wall of the pipe conduit or channel, until the adhesive between the tubing and the inner wall of the pipe conduit or channel has cured.

This method has the advantage that an adhesive which has a long pot life is not required and that no special requirements have to be made of the time control of the method sequence. The adhesive can be introduced into the tubing at any time before the tubing is introduced into the pipe conduit.

A particularly advantageous embodiment of this method consists in the fact that an adhesive, which cures under anaerobic conditions and on contact with metal, is used which is applied to the inner wall of a pipe conduit or a channel formed from metal. Here the curing begins immediately after the inverted tubing has been brought into contact with the inner wall of the pipe conduit and due to the internal pressure in the tubing, the air is pressed out of the gap between the tubing and the pipe conduit, such that only adhesive remains in said gap. Further embodiments consist in the use of a multi-component adhesive, of which at least one component is applied to the inner wall of the pipe conduit before the tubing is introduced and the remaining components are introduced into the tubing before it is introduced, or in the use of a multi-component adhesive, of which at least one component is enclosed in micro-capsules which are destroyed on the outer side of the inverted tubing.

The method according to the fifth aspect of the invention also uses a tubing comprising a coated woven fabric, meshing, knitted fabric or non-woven and has the following steps:

filling the tubing with a metered amount of an adhesive under conditions in which curing of the slow-curing adhesive takes place, with even distribution over the length of the tubing, introducing the tubing into the pipe conduit or the channel, the one end of the tubing being held securely at the rear end, in the direction of movement of the tubing, of the pipe conduit or channel, and the tubing being introduced by means of pressure application by being inverted into the pipe conduit or channel, creating the conditions for the adhesive which is located on the outer side of the inverted portion of the tubing to harden in a short time, and generating an internal pressure, which is higher than the pressure required to invert the tubing, in the introduced tubing, to press the latter against the inner wall of the pipe conduit or channel until the adhesive between the tubing and the inner wall of the pipe conduit or channel has cured.

This method has the advantage that an adhesive with a short pot life is not required and that no special requirements have to be made of the time management of the method sequence. The adhesive can be introduced into the tubing in the usual time before the tube is introduced into the pipe conduit. There is a large time frame for the creation of the conditions for shortening the curing time.

A particularly advantageous measure for initiating or accelerating the curing in the method according to the $4^{th}$ or $5^{th}$ aspect consists in irradiating the adhesive with electromagnetic waves. These electromagnetic waves can comprise UV radiation, infrared radiation or microwaves. A combination of different types of radiation is also advantageous. Thus UV rays are particularly suitable for plastic coatings having a thickness of up to 2 mm, whilst with larger thicknesses there is the danger that the plastic coating is not cured right through. On the other hand, infrared rays penetrate further into the plastic coating and lead to complete hardening even of plastic coatings which are significantly thicker than 2 mm. Since the woven fabric, meshing, knitted fabric or non-woven which is respectively impregnated with adhesive usually has a thickness of more than 2 mm, a combination of irradiation with UV rays followed by irradiation with infrared rays is to be recommended in order to achieve complete curing of the adhesive.

Furthermore, curing by ultrasonic waves is possible, which can also be combined with curing by electromagnetic waves. The use of electromagnetic waves and/or ultrasonic waves replaces the previously conventional curing with steam or hot water. During steam-curing, water can condense which collects at deep points and prevents completed curing there. Curing with hot water is energy-intensive, especially in the case of long pipes and pipes of large diameter; moreover, on account of pipe expansion and the mechanical stresses connected therewith, the water temperature must not be very high (for example 30° C.), as a result of which the curing times are still very long.

Admittedly Chandler (U.S. Pat. No. 5,634,743) and Wood (U.S. Pat. No. 4,135,958) disclose curing with the aid of microwaves, infrared radiation or ultrasound, but by these means rigid lining pipes inside pressure-free channels or pipe conduits are produced from resin, especially polyester, epoxy or polyurethane, which are not glued to the channel or pipe wall. This cannot be compared with the curing of adhesive in order to glue a textile tubing or the like to the inner wall of a high-pressure pipe conduit in a non-porous manner.

The curing time of the fast-curing adhesive can be in the range between 1 minute and 6 hours: however it should be as short as possible and for technical reasons preferably about 30 minutes. It is therefore expedient to keep the time interval between the beginning of the curing of this adhesive and the pressing of the tubing against the inner wall as short as possible. When a metal pipe conduit is used this can be expediently achieved by suing an anaerobic adhesive which, after it has been applied to the inner wall, only begins to harden when contact with oxygen is prevented by the pressing on of the tubing. Another procedure consists in using a multi-component adhesive, the components of which are only mixed together in the pipe conduit or in the channel as soon as possible before they are applied to the inner wall.

It is also advantageous to control the time interval between the application of this adhesive and the pressing on of the tubing. Since the feed rate of the tubing is known, this can come about by measuring the spatial distance between the turning point of the tubing and the device for applying the adhesive, and by controlling the feed rate of this device in dependence on the measured distance.

The device for applying the adhesive is preferably a robot which can be moved through the pipe conduit or channel, and which is expediently battery-operated, so that not interrupting supply lines are required. This robot should also be able to be used for the preparatory cleaning of the pipe conduit or channel and therefore be equipped for example in addition with a sand-blasting device as well as a scraper or the like for removing unevenness and cavities.

The adhesive applied by the robot should advantageously be contained in a cartridge which is carried along on a mobile wagon. If the cartridge is empty it can be exchanged for a full cartridge in the target trench. By this means, the use of a tube for supplying adhesive to the robot becomes superfluous.

Furthermore, the cleaning can be limited to purely mechanical cleaning for example with brushes and/or cutters, the dirt detached from the inner wall of the pipe being extracted by suction. For this, too, no hose connection to the outside is required, which has all the more advantageous an effect the longer the distance to be lined in one step is.

For cleaning longer distances, the use of special scrapers is recommended, which are driven through the pipe to be lined and in so doing, as a result of their external geometrical structure, can so process the inner wall of the pipe that the latter forms an adequate base for receiving adhesive. The dirt ejected from the inner wall of the pipe during this process must be extracted later or simultaneously.

DETAILED DESCRIPTION OF THE DRAWINGS AND THE PRESENTLY PREFERRED EMBODIMENTS

Figure 1:
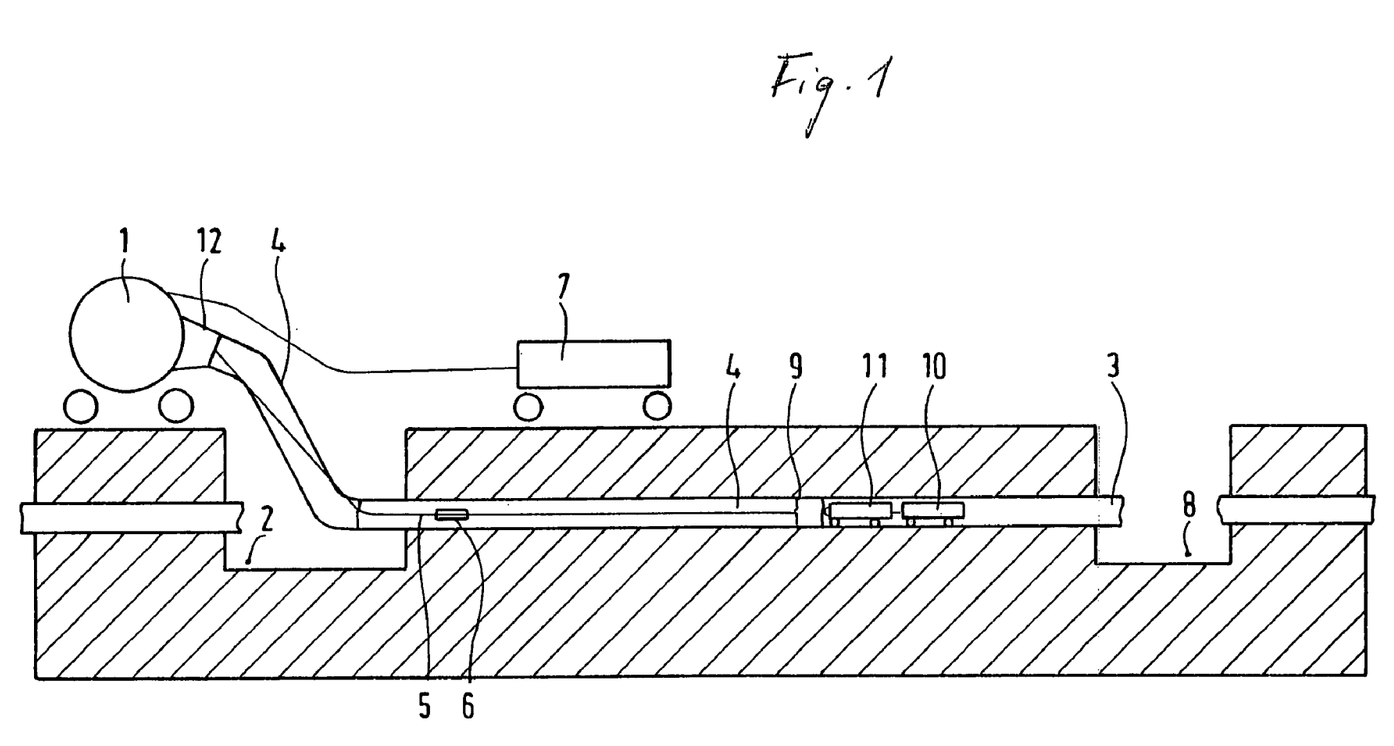
FIG. 1 shows the process of introducing a tubing comprising a plastic-coated fabric into a pipe conduit to be renovated, two adhesives having a differing pot life being used.

As shown in FIG. 1, a mobile rotary drum 1 is located in the immediate vicinity of an installation trench 2 for a pipe conduit 3 to be renovated. At the beginning of the renovation process, there is located in the rotary drum 1 in a coiled state a textile tubing 4 at least 100 m in length, preferably more than 500 m, which contains in its interior a metered amount of slow-curing adhesive. Furthermore, communicating with the textile tubing 4 is a likewise coiled retaining tape 5 of roughly the same length, the two being coupled-together via a connecting piece 6. A mobile air compressor 7 is connected to the rotary drum 1 and generates in the latter an increased pressure in relation to the atmosphere.

The pipe conduit 3 formed from metal, preferably steel, grey cast iron or ductile cast iron, plastics material, preferably PVC or GRP (glass-fibre reinforced plastic) or mineral material, preferably asbestos cement, stoneware, fibre-reinforced cement, concrete, reinforced concrete or brickwork, opens out at the end opposite the installation trench 2 into a target trench 8. In the section of the pipe conduit 3 between the end 9 facing the target trench 8 (moving turning point) of the textile tubing 4 and the target trench 8 is located a mobile robot 10,11 which is battery-operated and thus does not require any supply lines. The robot 10,11 is equipped with a sand-blasting device and an adhesive spraying unit.

Before the renovation process starts, the robot 10,11 travels through the pipe conduit 3 which is exposed at both ends and cleans the latter, e.g. by sand-blasting. Any roughness or cavities can be removed by scrapers.

Simultaneously an adhesive which has a pot life in the range between 1 and 6 hours, which depends substantially on the length of the tubing, is introduced into the textile tubing 4 and evenly distributed along its length. Then first the retaining tape 5 and then the textile tubing 4 are coiled up in the rotary drum 1.

At the beginning of the renovation process, the start of the textile tubing 4 is secured to a reversal head 12 attached to the rotary drum 1, and then the textile tubing 4 is pressed outwards by the air pressure prevailing in the rotary drum 1, the tubing being simultaneously turned inside out. The advancing end of the inverted textile tubing 4 is introduced into the pipe conduit 3. Through the inversion process, the interior of the textile tubing 4 is turned to the outside, such that the plastic coating is located on the side pointing into the interior of the pipe and the adhesive is located on the side of the textile tubing facing the inner wall of the pipe. The retaining tape 5 guarantees controlled forward motion of the textile tubing 4 as it is pressed in, in order to ensure that the adhesive between the textile tubing 4 and pipe conduit 3 is evenly distributed and the textile tubing 4 is pressed against the pipe conduit wall without any folds.

During this pressing-in process, the robot 10,11 is used to apply a fast-curing adhesive, with a curing time of roughly 30 minutes, to the inner wall of the pipe conduit 3, immediately before the textile tubing 4 is pressed against the inner wall. For this purpose, the robot 10,11 is for example filled with the adhesive in the target trench 8 and then travels as far as just before the end 9 of the textile tubing 4. With the aid of its spraying unit, the robot 10,11 then begins to distribute the adhesive uniformly over the entire circumference of the inner wall of the pipe conduit 3, moving back at the same speed as the end 9 of the textile tubing 4 advances, such that the spacing between the robot 10,11 and the end 9 remains the same. For this purpose, the robot 10,11 is expediently provided with a distance measuring device, operating by means of ultrasound for example, such that on the basis of the measured spacing, the speed of the robot 10,11 can be so controlled that this spacing remains constant. This spacing is so selected that it corresponds at the most to the path covered within a few minutes by the end of the tubing 9, i.e. the tubing end 9 always reaches the fast-curing adhesive before its pot life has expired.

Since the tubing fabric has already been impregnated with the slow-curing adhesive, the fast-curing adhesive only penetrates insignificantly from the inner wall of the pipe conduit 3 into the fabric. However this is sufficient to hold the textile tubing 4 against the inner wall of the pipe conduit 3 after the fast-curing adhesive has cured. The pressure generated by the air compressor 7 in the interior of the textile tubing 4 therefore, after the latter has reached the end of the pipe conduit 3 in the target trench 8, only needs to be maintained until the fast-curing adhesive has cured. The rotary drum 1 can then be uncoupled from the introduced textile tubing 4 and then be started again for the next renovation process long before the slow-curing adhesive has cured. The internal pressure prevailing within the pipe conduit during normal operation here presses the textile tubing 4 against the inner wall of the pipe conduit 3 in addition.

Since pressing the textile tubing 4 into the pipe conduit 3 takes a long time, usually more than an hour, on account of the short curing time of the adhesive sprayed by the robot 10,11, it is necessary for the latter only to begin to cure during the pressing-in process directly before or even after being applied to the inner wall of the pipe conduit 3. This is the case for example if a multi-component, preferably a two-component adhesive is used, the individual components of which are accommodated separately in the robot 10,11 and only mixed together in a mixing device provided in the robot immediately before being sprayed onto the pipe inner wall.

In the example shown, the robot comprises two wagons 10 and 11 coupled together. Wagon 10 serves as the drive device and is so equipped that it can be respectively coupled with one of several different wagons. These wagons serve to accomplish various measuring, inspection or working processes such as spacing, thickness or caliber measurements, examinations of the pipe conduit/tubing connection for cavities (rear bedding conditions) by means of ultrasound, examinations by means of remote cameras, cleaning by means of high-pressure water, extraction work using negative pressure, sand-blasting, cutting, scraping, spraying or coating, wrapping work and the like. Purely container wagons are also possible which are for example filled with cleaning or coating agents. In this case the container wagon and the associated working wagon are together pulled or pushed through the pipe conduit 3 by the driving wagon.

Once a measuring or working process has ended, the corresponding wagon is pulled or pushed out of the drive wagon 10 at the pipe conduit 3 and uncoupled. The necessary wagon(s) for the next measuring or working process is/are connected up and, to carry out the process, are pulled or pushed through the pipe conduit 3 at the corresponding speed. If the pipe conduit 3 has a correspondingly large diameter, manned wagons can also be pulled or pushed through it.

The embodiment shown in FIG. 1 relates to the first aspect of the present invention. For the method according to the second or third aspects of the invention, substantially the same device is used; however in the case of the second and third aspects the filling of adhesive which has a long pot life into the tubing before the inversion process is dispensed with and in the case of the case of the fourth and fifth aspects, there is no application of adhesive to the inner wall of the pipe conduit. For the method according to the second aspect, in addition a textile tubing is used which has been completely impregnated with a resin or the like, whilst in the method according to the third aspect, the same tubing can be used as in the method according to the first aspect. On the other hand it is necessary for higher air pressure to be generated in the rotary drum 1. It is also advantageous to apply a thicker adhesive layer to the inner wall of the pipe conduit 3 and to provide an extraction device to create a negative pressure in the portion of the pipe conduit 3 which has not yet been lined; the end of said pipe conduit protruding into the target trench 8 would then have to be sealed from the atmosphere. Alternatively, with a sealing element on the drive wagon 10 it can be made possible for negative pressure only to have to be generated in the portion of the pipe conduit between said sealing element and the end 9 of the tubing.

Figure 2:
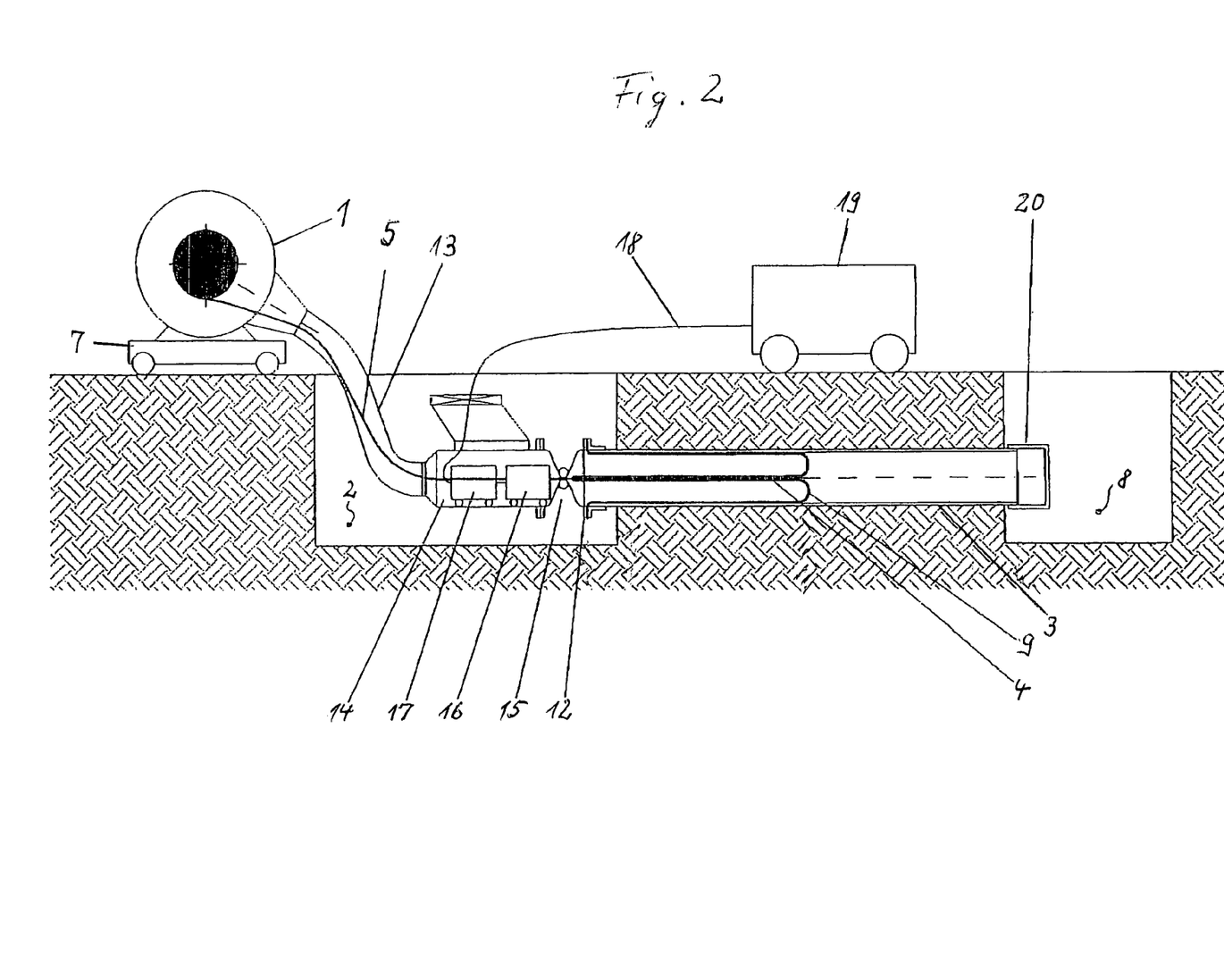
FIG. 2 shows the process of introducing a tubing into a pipe conduit in a stage before the start of curing the adhesive by irradiation.
Figure 3:
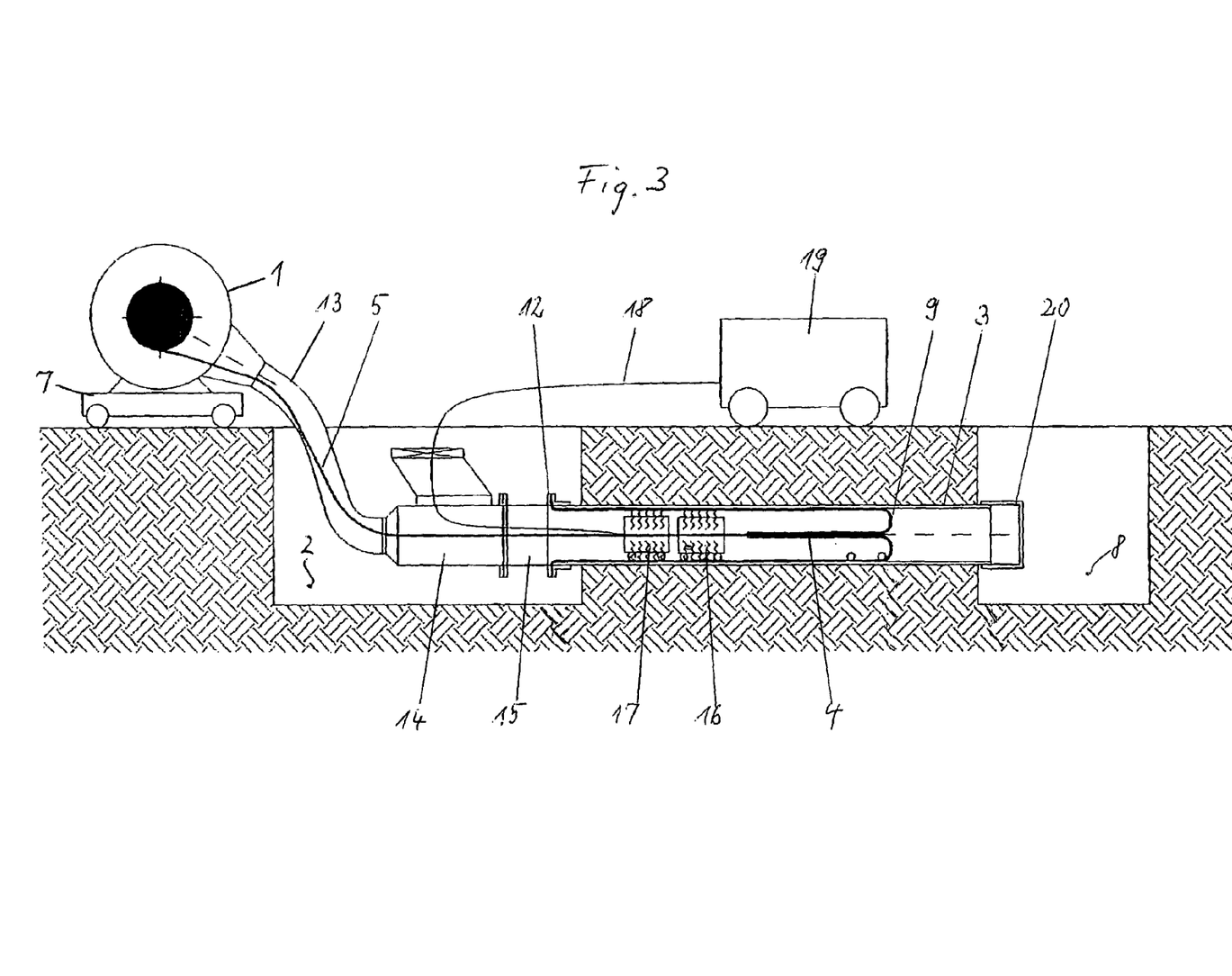
FIG. 3 shows a stage in which the introduction of the tubing and the curing take place simultaneously.
Figure 4:
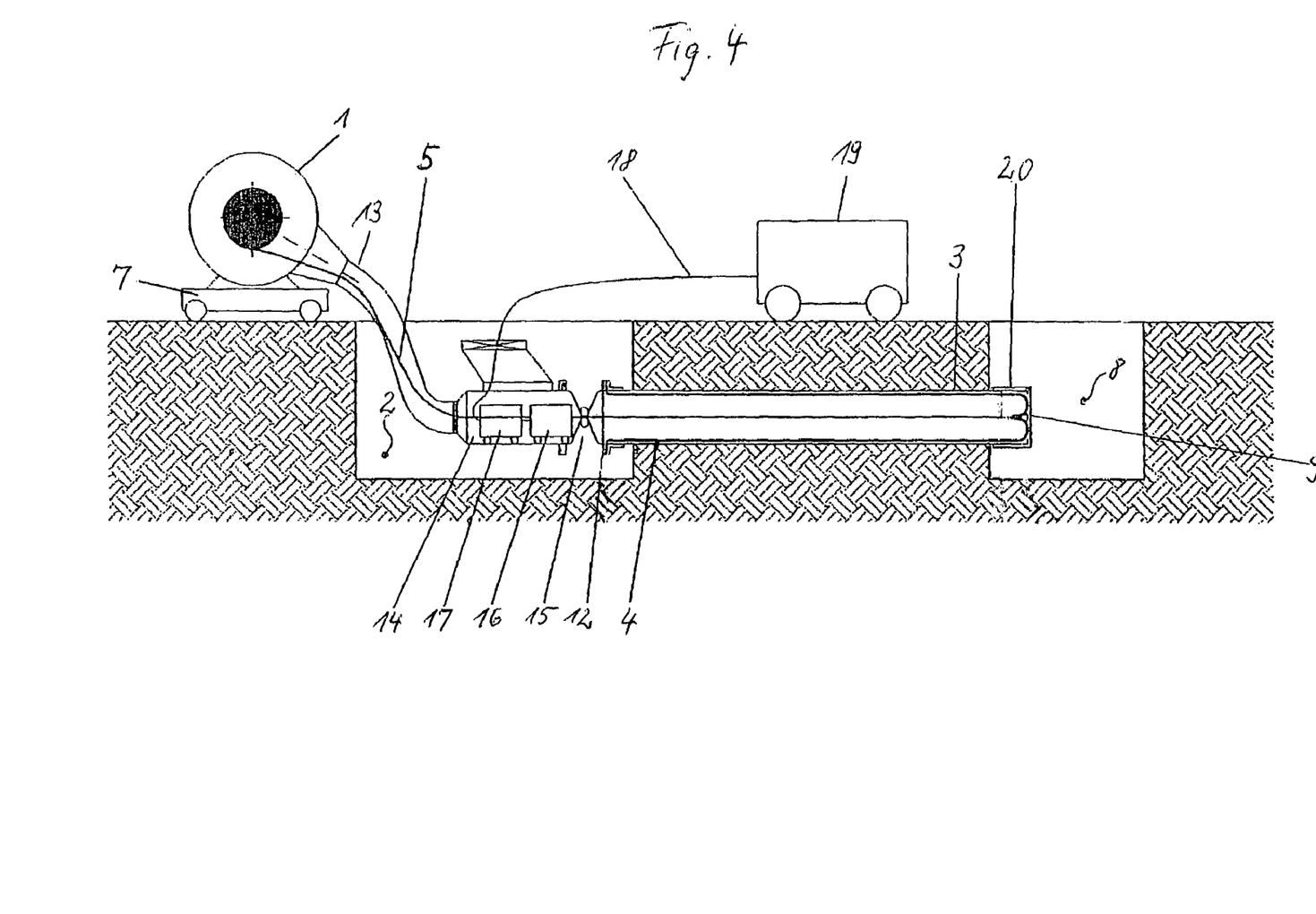
FIG. 4 shows a process in which the curing of the adhesive by irradiation only begins once the tubing has been completely introduced.

FIGS. 2 to 4 show embodiments which relate to the fourth and fifth aspects of the present invention. Here an adhesive, which has a long curing time or is in a state in which no curing takes place, is introduced into the textile tubing 4 before it is coiled up in the rotary drum 1. Furthermore, the reversal head 12 is not fastened to the pressure drum 1 but is attached to the end of the pipe conduit 3 protruding into the installation trench 2. Between the rotary drum 1 and the reversal head 12 are located, in succession, an intermediate hose 13, through which the textile tubing 4 and then the retaining tape 5 are led as the textile tubing 4 is introduced into the pipe conduit 3, a lock 14 and a pinching-off device 15. In contrast to FIG. 1, the air compressor 7 is securely connected to the rotary drum 1.

At the start of the renovation process, the free end of the coiled textile tubing 4 is pulled through the intermediate hose 13, the empty lock 14 and the opened pinching-off device 15 as far as the reversal head 12 and secured to the latter. Then, by means of the air compressor 7, the pressure in the rotary drum 1, the intermediate hose 13, the lock 14 and the pinching-off device 15 is increased so that the textile tubing 4 is uncoiled from the rotary drum 1 and inverted as it is pressed into the pipe conduit 3. In this process, the adhesive located inside the tubing reaches the outer side of the textile tubing 4 which abuts against the inner surface of the pipe conduit 3. The pressure generated by the air compressor 7 is here so high that any cavities in the textile tubing 4 are completely filled with adhesive.

When the front end 9, in the direction of movement, of the textile tubing 4 has reached the longitudinal centre of the pipe conduit 3, as is shown in FIG. 2, the pinching-off device 15 is closed such that the passage of the textile tubing 4 or of the retaining tape 5 is sealed off. The air compressor is switched off and the lock 14 is opened. The air pressure in the inverted portion of the textile tubing 4 is, however, maintained by the pinching-off device 15 such that the textile tubing 4 continues to be pressed against the interior wall of the pipe.

Two radiation units, preferably a front UV-radiation unit 16 and a rear IR-radiation unit 17 are now inserted into the open lock 14 and securely coupled to the retaining tape 5. The lock 14 is then closed again, a control and power supply cable 18, which connects the radiation units 16 and 17 to an energy supply and control device 19, being guided through a sealed lock lid.

Then the air compressor 7 is switched on again, the pinching-off device 15 is opened again and the inversion of the textile tubing 4 into the pipe conduit 3 is continued. The radiation units 16 and 17 are switched on and pulled by the retaining tape 5 through the inverted textile tubing 4. In this process, the adhesive filling the textile tubing 4 in a non-porous manner is first at least pre-hardened by the radiation emitted by the UV-radiation unit 16 and then completely cured by the radiation emitted by the IR-radiation unit 17, such that the textile tubing 4 is securely connected to the inner wall of the pipe. This stage of the method is shown in FIG. 3.

When the front end 9 of the textile tubing 4 has reached a receiving basket 20 placed on the end of the pipe conduit 3 which protrudes into the target trench 8, the radiation units 16 and 17 have also traveled through the entire inverted textile tubing 4 since the retaining tape 5 moves through the pipe conduit 3 twice as fast as the front end 9 of the textile tubing 4.

FIG. 4 shows a modification of the device or of the method and of FIGS. 2 and 3. The renovation process proceeds initially as described with the aid of FIG. 2 but the inversion process is not interrupted when the front end 9 of the textile tubing has reached the longitudinal centre of the pipe conduit 3 but is continued until the end 9 has reached the receiving basket 20. Only then is the pinching-off device 15 closed, the air compressor 7 switched off, the lock 14 opened and the radiation units 16 and 17 inserted. Once the lock 14 is closed again and the air compressor 7 switched on, the pinching-off device 15 is opened again so that the radiation units 16 and 17 can travel into the inverted textile tubing 4. Since, however, the inversion process is ended and the retaining tape 5 is thus completely pulled in, the radiation units 16 and 17 must move under their own force, the retaining tape 5 being able to act as a guiding element for them.

This device or this method has the disadvantage that the radiation units 16,17 require their own drive mechanism and that the renovation process lasts longer than with the device or the method according to FIGS. 2 and 3. On the other hand there is the advantage that the speed of introduction of the textile tubing 4 and the traveling speed of the radiation units 16,17 are decoupled from one another and therefore can each be adjusted in an optimal manner, independently of one another.

A variant of this method consists in the following: once the radiation units 16 and 17 have been inserted into the lock 14, the lock is closed again and if necessary the air pressure in it is increased again, the connection between the intermediate hose 13 and the lock 14 is separated and the lock 14 and the separation point are sealed air-tight. The pinching-off device 15 is then opened and the pressure is maintained during the subsequent curing of the adhesive by the radiation units 16,17 in the textile tubing 4. This measure has the advantage that the rotary drum 1 and the air compressor 7 are no longer required during the curing and can be used elsewhere.

Another variant of this method consists in an additional lock which has a sealed passage for the retaining tape 5 being provided on the receiving basket 20. Once the textile tubing 4 has been completely inverted, as is shown in FIG. 4, the retaining tape 5 is detached from the textile tubing 4 and pulled through the lock into the target trench 8. The radiation units 16,17 which are securely connected to the retaining tape 5 are then moved through the textile tubing 4 without their own drive mechanism.

Another variant consists in that the textile tubing 4 from the rotary drum is inverted via a reversal head from the starting trench 2 into the pipe conduit 3. In that variant the pinching-off device 15 and the lock 14 are located at the receiving basket 20 in the target trench 8. After completely inversing the textile tubing 4, the latter is closed by the pinching-off device 15 and the retaining tape is separated from the textile tubing 4 and coupled with the radiation units 16,17 which are provided in the lock 14. The end of the textile tubing 4 is connected with the lock 14 in a pressure-tight manner. then the radiation units 16,17 are pulled by the retaining tape 5 through the pipe conduit 3 to the starting trench 2 thereby reversing the direction of rotation of the rotary drum 1.

What is claimed:

1. A method for lining a duct having an inner wall with a sealing inner lining in the form of a tubing adhering by means of adhesive to the duct inner wall, the tubing having a first end, a second end, a retaining tape coupled to the second end, the tubing comprising a coated material comprising at least one of a woven fabric, meshing, knitted fabric or non-woven fabric, the method comprising the steps of:
   filling the tubing with a metered amount of an uncured adhesive so that the adhesive is evenly distributed over the tubing's entire length,
   introducing the tubing including the uncured adhesive into the duct while holding the first end of the tubing, the tubing being introduced by means of fluid pressure application inverting the tubing within the duct as a controlled moving inversion point, the tubing second end and retaining tape traveling though the tubing during the introducing step,
   creating conditions for curing the adhesive located only on the inverted portion of the tubing including a step of irradiating the adhesive by at least one radiation unit coupled to the retaining tape, the at least one radiation unit emitting UV rays, IR rays, Microwaves or ultrasound, and
   holding an internal pressure in the introduced tubing in order to press the tubing against the inner wall of the duct, until the adhesive between the tubing and duct inner wall has cured.

2. The method of claim 1, wherein the step of irradiating comprises irradiating the adhesive with microwaves.

3. The method of claim 1, wherein the step of irradiating comprises irradiating the adhesive with UV rays.

4. The method of claim 1, wherein the step of irradiating comprises irradiating the adhesive with IR rays.

5. The method of claim 1, wherein the step of irradiating comprises irradiating the adhesive with ultrasound.

6. The method of claim 1, wherein the step of irradiating comprises irradiating the adhesive with at least two different kinds of radiation.

7. The method of claim 6, wherein the step of irradiating comprises consecutive irradiating the adhesive with UV rays and IR rays.

8. A method for lining a duct having an inner wall with a sealing inner lining in the form of a tubing adhering by means of an adhesive to the duct inner wall, the tubing having a first end, a second end, a retaining tape coupled to the second end, the tubing comprising a coated material comprising at least one of a woven fabric, meshing, knitted fabric or non-woven fabric, the method comprising the steps of:
  filling the tubing with a metered amount of an adhesive so that the adhesive is evenly distributed over the tubing's entire length, the adhesive having begun to cure at a first rate,
  introducing the tubing including the curing adhesive into the duct while holding the first end of the tubing, the tubing being introduced by means of fluid pressure application inverting the tubing within the duct as a controlled moving inversion point, the tubing second end and retaining tape traveling though the tubing during the introducing step,
  accelerating the curing of the adhesive located only on the inverted portion of the tubing, including a step of irradiating the adhesive by at least one radiation unit coupled to the retaining tape, the at least one radiation unit emitting UV rays, IR rays, Microwaves or ultrasound, and
  holding an internal pressure in the introduced tubing in order to press the tubing against the inner wall of the duct, until the adhesive between the tubing and duct inner wall has cured.

9. The method of claim 8, wherein the step of irradiating comprises irradiating the adhesive with microwaves.

10. The method of claim 8, wherein the step of irradiating comprises irradiating the adhesive with UV rays.

11. The method of claim 8, wherein the step of irradiating comprises irradiating the adhesive with IR rays.

12. The method of claim 8, wherein the step of irradiating comprises irradiating the adhesive with ultrasound.

13. The method of claim 8, wherein the step of irradiating comprises irradiating the adhesive with at least two different kinds of radiation.

14. The method of claim 8, wherein the step of irradiating comprises consecutively irradiating the adhesive with UV rays and IR rays in any order.

15. The method according to claims 1 or 8, wherein the duct consists essentially of a metal.

16. The method according to claim 15, wherein the metal is selected from steel, grey cast iron, ductile cast iron, and copper.

17. The method according to claims 1 or 8, wherein the duct consists essentially of a plastics material.

18. The method according to claim 17, wherein the plastics material consists of PVC or GRP.

19. The method according to claims 1 or 8, wherein the duct consists essentially of a mineral material.

20. The method according to claim 19, wherein the mineral material consists of asbestos cement, stoneware, fibre-reinforced cement, concrete, reinforced concrete or brickwork.

21. The method according to claims 1 or 8, wherein the tubing introduced has a length of at least 60 m.

22. The method according to claim 21, wherein the tubing introduced has a length of at least 300 m.

23. The method according to claim 1 or 8, in which a lock is provided for introducing the at least one radiation unit into the pressurized inverted tubing.

24. The method according to claim 1 or 8, in which a pinching-off device is provided for sealing the pressurized inverted tubing.

25. The method according to claim 1 or 8, in which the at least one radiation unit has its own drive mechanism for traveling through the tubing.

26. The method according to claim 1 or 8, in which at least two radiation units, arranged one behind the other, are provided for emitting radiation.

27. The method according to claim 26, in which a front radiation unit in the direction of travel emits UV rays and a rear radiation unit emits IR rays.

28. The method according to claim 1 or 8, wherein the at least one radiation unit is moved through the tubing using the pressure drum or an accessory drive system.

29. The method according to claim 1 or 8, wherein at least one self propelled radiation unit moves through the tubing using the retaining tape as a guide.

30. The method according to claim 1 or 8, wherein the at least one radiation unit is provided for curing the adhesive during said inverting of the tubing.

31. The method according to claim 1 or 8, wherein the at least one radiation unit is coupled to the retaining tape after said inverting of the tubing for being moved through the tubing.

32. The method according to claim 31, further comprising a rotary drum coupled to the tubing, and wherein the speed of the at least one radiation unit during movement through the tubing is controlled by controlling the rotation speed of the drum with the radiation unit being in the state of irradiating the adhesive.

33. The method according to claim 31, wherein the at least one radiation unit is drawn by the retaining tape through the tubing opposite to the introducing direction of the tubing without irradiating the adhesive, and thereafter the at least one radiation unit is drawn by a control and power supply cable through the tubing in the direction of the introducing of the tubing while irradiating the adhesive.

34. The method according to claim 33, wherein the speed of drawing the at least one radiation unit in the direction of inserting is controlled.

35. The method according to claim 31, wherein the retaining tape is separated from the tubing before moving the at least one radiation unit through the tubing.

36. The method according to claim 35, wherein the tubing is closed at its end in the direction of introduction after said inverting of the tubing.

37. The method according to claim 1 or 8, wherein the at least one radiation unit is coupled to the retaining tape after said inverting of the tubing for being moved through the tubing.

38. The method according to claim 1 or 8, wherein the at least one radiation unit is coupled to the retaining tape to move with the retaining tape in the direction of the tubing introduction during the inverting of the tubing, and following separation of the retaining tape from the tubing the at least one radiation unit is drawn by the retaining tape in the opposite direction.

* * * * *

UNITED STATES PATENT AND TRADEMARK OFFICE
CERTIFICATE OF CORRECTION

PATENT NO. : 7,641,756 B2  
APPLICATION NO. : 11/491615  
DATED : January 5, 2010  
INVENTOR(S) : Siegfried Schwert Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Sixteenth Day of November, 2010

David J. Kappos  
*Director of the United States Patent and Trademark Office*